(12) United States Patent
Boston et al.

(10) Patent No.: US 9,863,465 B2
(45) Date of Patent: Jan. 9, 2018

(54) SLOTTED ENTRY BEARING WITH MOLDED SEAL

(71) Applicant: Rexnord Industries, LLC, Milwaukee, WI (US)

(72) Inventors: Daniel T. Boston, Los Angeles, CA (US); Vivek Chopra, Simi Valley, CA (US); Majid Vigeh, Newbury Park, CA (US)

(73) Assignee: Rexnord Industries, LLC, Milwaukee, WI (US)

( * ) Notice: Subject to any disclaimer, the term of this patent is extended or adjusted under 35 U.S.C. 154(b) by 0 days.

(21) Appl. No.: 15/095,660

(22) Filed: Apr. 11, 2016

(65) Prior Publication Data
US 2017/0292563 A1    Oct. 12, 2017

(51) Int. Cl.
*F16C 23/04*    (2006.01)
*F16C 23/08*    (2006.01)
(Continued)

(52) U.S. Cl.
CPC ........ *F16C 11/069* (2013.01); *F16C 11/0614* (2013.01); *F16C 11/0666* (2013.01); *F16C 11/0685* (2013.01); *F16C 11/083* (2013.01); *F16C 23/043* (2013.01); *F16C 23/045* (2013.01); *F16C 23/084* (2013.01);
(Continued)

(58) Field of Classification Search
CPC . F16C 11/0614; F16C 11/069; F16C 11/0685; F16C 17/12; F16C 23/043; F16C 23/045; F16C 23/084; F16C 2223/10; F16C 2220/04; F16C 2220/06; F16C 2220/08

USPC ....... 384/192, 206–214, 296, 300, 495, 498, 384/903, 908, 477; 29/898.043, 898.051, 29/898.11, 402.02
See application file for complete search history.

(56) References Cited

U.S. PATENT DOCUMENTS 2,423,684 A * 7/1947 Collito, Jr. ............ F16C 23/045
                                                      384/208
2,906,568 A * 9/1959 Gray .................... F16C 23/045
                                                      384/210
(Continued)

FOREIGN PATENT DOCUMENTS

JP    S60155011 A    8/1985
JP    H09177777 A    7/1997

OTHER PUBLICATIONS

Rexnord Aerospace, Rexnord PSI Aerospace Rexlon 2000 Self-Lubrication Liner Material, product brochure, copyright 2015, 2 pages.
(Continued)

*Primary Examiner* — Marcus Charles
(74) *Attorney, Agent, or Firm* — Quarles & Brady LLP (57) ABSTRACT

A method of manufacturing a slotted entry bearing assembly includes inserting an inner race into a central space of an outer race. The outer race is configured to receive the inner race through at least one slot. Once the inner race is fully inserted into the outer race, it is rotated approximately ninety degrees within the center space, effectively locking the inner race within the outer race. After the inner race is rotated ninety degrees, a molded seal is molded between the inner race and the at least one slot. The molded seal adheres to the at least one slot and is made of a polymeric material. The molding process used to mold the molded seal may be compression molding.

23 Claims, 5 Drawing Sheets

(51) Int. Cl.
F16C 11/06 (2006.01)
F16C 11/08 (2006.01)

(52) U.S. Cl.
CPC ...... *F16C 2220/04* (2013.01); *F16C 2220/08* (2013.01); *F16C 2326/43* (2013.01)

(56) References Cited

U.S. PATENT DOCUMENTS

| | | | | |
|---|---|---|---|---|
| 3,506,315 A * | 4/1970 | Young, Jr. | ............ | F16C 11/0614 384/208 |
| 3,683,474 A * | 8/1972 | Young, Jr. | ............. | F16C 23/045 29/898.043 |
| 4,076,343 A * | 2/1978 | McCloskey | ........... | F16C 23/045 384/210 |
| 4,080,015 A * | 3/1978 | Greby | ................... | F16C 23/045 277/507 |
| 4,116,504 A * | 9/1978 | Cass | ................... | F16C 11/0614 384/210 |
| 4,848,934 A * | 7/1989 | Blakely | ................. | F16C 33/102 384/206 |
| 5,219,231 A * | 6/1993 | Sheedy | ................. | F16C 23/045 384/192 |
| 5,265,965 A * | 11/1993 | Harris | ................... | F16C 23/045 384/192 |
| 5,524,987 A | 6/1996 | Vigeh | | |
| 6,988,830 B2 * | 1/2006 | Maasch | ................ | F16C 23/045 384/206 |
| 7,223,019 B2 * | 5/2007 | Hoppe | .................. | F04B 1/2071 384/192 |
| 8,876,390 B2 * | 11/2014 | McNeil | .................. | F16C 33/12 384/206 |

OTHER PUBLICATIONS

European Patent Office, Extended European Search Report, Application No. 17164792.8, dated Aug. 22, 2017, 10 pages.

* cited by examiner

SLOTTED ENTRY BEARING WITH MOLDED SEAL

CROSS-REFERENCE TO RELATED APPLICATION

Not applicable.

STATEMENT OF FEDERALLY SPONSORED RESEARCH OR DEVELOPMENT

Not applicable.

TECHNICAL FIELD

This disclosure relates to slotted entry bearings for use in aerospace landing gear.

BACKGROUND

Conventionally, slotted entry bearings are used in several applications to provide a rotatable connection point between components. One such application is aerospace landing gear. These slotted entry bearings can provide low friction rotatable connections capable of withstanding high loads during take-off or landing, while providing misalignment tolerance.

Slotted entry bearings are generally comprised of an inner race and an outer race. The inner race is inserted into the outer race, and the inner race and the outer race are rotatable relative to each other during operation with their surfaces bearing on one another.

To accommodate for misalignment of the inner race relative to the outer race, the inner race may have a spherically shaped outer surface to allow for triaxial rotation.

Given the geometry of the bearing surfaces, to accommodate insertion of the inner race during assembly, the outer race may be slotted on one axial face such that the inner race can fit through the slot of the outer race. This insertion of the inner race into the outer race occurs in an orientation where the inner race is perpendicular to its preferred rotation axis to provide the required clearance. Typically, the sides of the inner race are truncated and this truncation gives the inner race a frustospherical shape.

Once the inner race is inserted into the outer race, the inner race is then sealed into the outer race. At this point the slotted entry bearing is ready for operation.

SUMMARY

Traditionally slotted entry bearings are sealed by pouring a pourable sealant material into the slot area of the outer race and letting the sealant material set into a rigid seal. The sealant material needs to adhere to the slot of the outer race, but should not adhere to the inner race. Some examples of sealant materials used for these seals are Rexlon 2000 Type III and Devcon epoxy. Throughout the summary, it should be appreciated that although Rexlon 2000 Type III is mentioned, similar processes might be used when using Devcon epoxy. When using Rexlon 2000 Type III, the surface of the slot of the outer race is roughened to promote adhesion between the Rexlon 2000 Type III and the inner race. This roughening is achieved by at least one of grit blasting, etching (which may included acid etching), and ultrasonic cleaning. Moreover a surface agent is applied to the inner race to prevent adhesion between the Rexlon 2000 Type III and the inner race. Although this is ultimately effective, the step of surface agent application is both costly and time consuming.

An improved method of manufacturing for a slotted entry bearing assembly is disclosed herein. A benefit of the improved method is the elimination of the surface agent application step. This improvement reduces the overall production time and eliminates the cost of the surface agent. The improved method also provides a more mechanically robust final product. The improved method includes a molded seal that is less rigid than current sealant materials used. The more rigid sealant materials could, under extreme conditions, crack or delaminate from the outer race. The flexibility of the new molded seal may allow it to withstand these extreme conditions while still functioning properly. The improved method further provides a cleaner looking final product.

According to one aspect of the invention, a method of manufacturing a slotted entry bearing assembly is disclosed. The method includes the step of inserting an inner race into a central space of an outer race. The outer race is configured to receive the inner race through a loader slot area, which is formed by at least one slot on the side of the outer race. The method further includes the step of rotating the inner race approximately ninety degrees within the central space. Due to the shape of the inner race relative to the loader slot area of the outer race, this effectively locks the inner race within the outer race. The method further includes the step of molding a molded seal into the loader slot area of the outer race. The molded seal adheres to the loader slot area of the outer race and is made of a polymeric material.

The inner race defines an inner central axis. The central space of the outer race defines an outer central axis. The method step of inserting the inner race into the central space of the outer race may involve the inner central axis and the outer central axis being perpendicular to each other. In some forms, the inner race and the outer race may be made of a metallic material.

The method may further include the step of roughening the loader slot area of the outer race to promote adhesion between the loader slot area of the outer race and the molded seal. The step of roughening the loader slot area may include at least one of grit blasting, etching (which may included acid etching), and ultrasonic cleaning. The method may not further include treating the inner race with a surface agent to prevent adhesion between the inner race and the molded seal.

The molding process may comprise compression molding. In some other instances, the molding process may alternatively comprise injection molding. In yet some other instances, the molding process may alternatively comprise transfer molding.

The molded seal may be a flexible material. The flexible material may further be one of at least Fluorosilicone, Silicone, Polytetrafluoroethylene, Nitrile rubber, Fluoroelastomers such as Viton®, Polychloroprene, Polyurethane, Ethylene Propylene Diene Monomer, Perfluoroelastomeric compounds such as Kalrez®, Fluorinated Ethylene Propylene, and Tetrafluoroethylene and Propylene copolymer.

According to another aspect of the invention, a slotted entry bearing assembly comprises an inner race having an outer bearing surface. The slotted entry bearing assembly further comprises an outer race having a central space. The central space defines an inner bearing surface and is configured to receive the inner race. The inner bearing surface is configured to bear against the outer bearing surface during operation. The outer race further includes at least one slot, which forms a loader slot area. The loader slot area provides clearance for the insertion of the inner race into the central space of the outer race. The slotted entry bearing assembly further comprises a molded seal molded into the loader slot area of the outer race. The molded seal adheres to the loader slot area of the outer race and is made of a polymeric material. During operation, the inner race and the outer race are rotatable relative to each other. While the inner race and outer race rotate relative to each other, the inner bearing surface of the outer race bears on the outer bearing surface of the inner race.

In some instances, the inner race may include an outer bearing surface that defines a frustospherical shape. This frustospherical shape can provide the inner race with triaxial rotation within the outer race. In some forms, the inner race may include a central opening. This central opening may be coupled to a variety of components in an application. The inner race may be made of a metallic material.

In some instances, the inner race may not be treated with a surface agent on the outer bearing surface to prevent adhesion between the outer bearing surface of the inner race and the molded seal.

The slotted entry bearing assembly may include an outer race having at least one slot that is located on an axial side of the outer race. The outer race may further be made of a metallic material.

In some instances, the slotted entry bearing assembly may include an inner race and an outer race that are rotatable relative to each other in a misaligned position during operation.

The slotted entry bearing assembly may further include a molded seal that is a compression molded seal. In some instances, the slotted entry bearing assembly may alternatively include a molded seal that is an injection molded seal. In some other instances, the slotted entry bearing assembly may alternatively include a molded seal that is a transfer molded seal.

The molded seal can be a flexible material. The flexible material may further be at least one of Fluorosilicone, Silicone, Polytetrafluoroethylene, Nitrile rubber, Fluoroelastomers such as Viton®, Polychloroprene, Polyurethane, Ethylene Propylene Diene Monomer, Perfluoroelastomeric compounds such as Kalrez®, Fluorinated Ethylene Propylene, and Tetrafluoroethylene and Propylene copolymer.

These and still other advantages of the invention will be apparent from the detailed description and drawings. What follows is merely a description of some preferred embodiments of the present invention. To assess the full scope of the invention, the claims should be looked to as these preferred embodiments are not intended to be the only embodiments within the scope of the claims.

DETAILED DESCRIPTION

Figure 1:
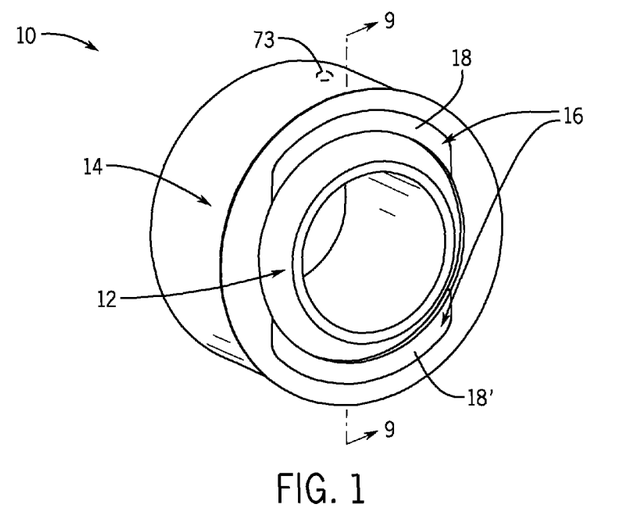
FIG. 1 is a perspective view of a slotted entry bearing assembly according to one embodiment of the invention.

Referring to FIG. 1, a slotted entry bearing assembly 10 is illustrated. A slotted entry bearing assembly 10 of this type can be used to provide low friction rotatable connections between components in several applications, while providing misalignment tolerances.

FIG. 1 shows a slotted entry bearing assembly 10 including an inner race 12, an outer race 14 and a molded seal 16. The molded seal 16 includes an upper portion 18 and a lower portion 18'.

Figure 2:
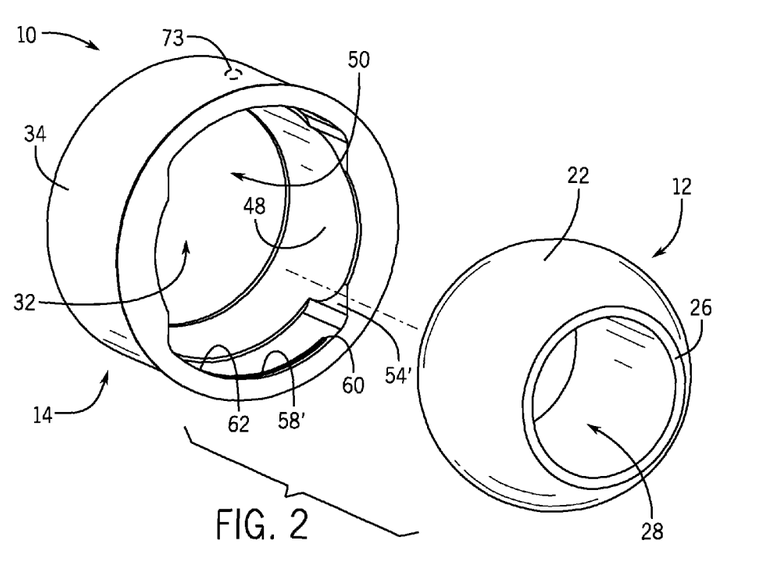
FIG. 2 is an exploded perspective view of the slotted entry bearing assembly of FIG. 1 not including the molded seal.
Figure 3:
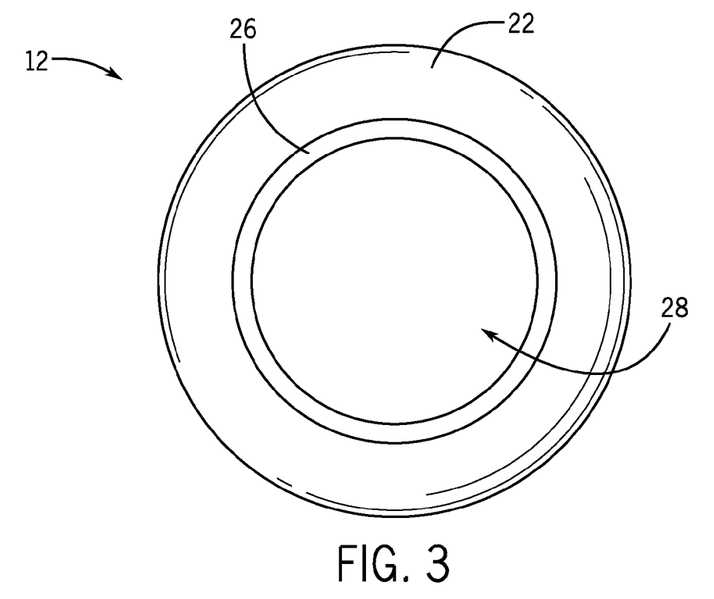
FIG. 3 is an elevational front view of the inner race of the slotted entry bearing assembly of FIG. 1 which is identical to an elevational rear view.
Figure 4:
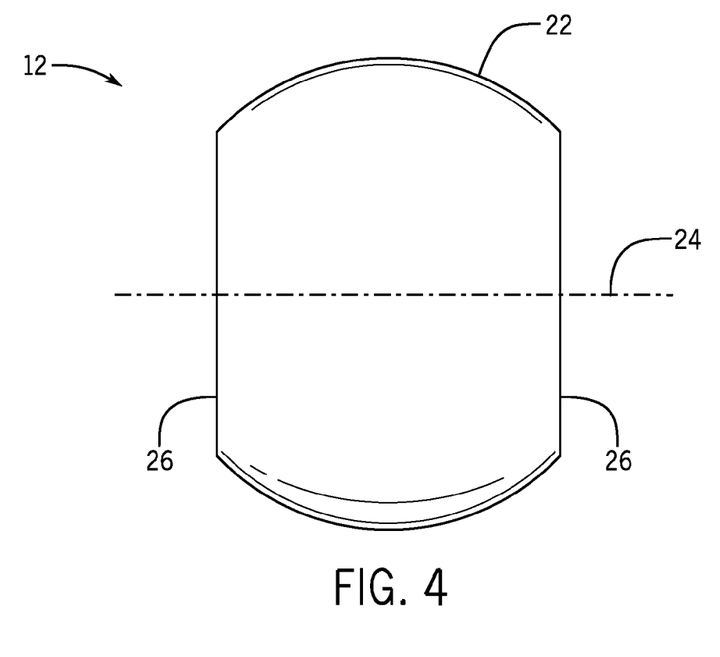
FIG. 4 is an elevational left view of the inner race of the slotted entry bearing assembly of FIG. 1.

Referring to FIGS. 2, 3, and 4, the inner race 12 of the slotted entry bearing assembly 10 may be made of a metallic material and is generally annular in shape. The inner race 12 includes a radially outward facing surface 22, having a central axis 24, and two end surfaces 26 opposite each other and perpendicular to the central axis 24. The radially outward facing surface 22 of the inner race 12 defines a substantially spherical shape. The two end surfaces 26 effectively truncate the radially outward facing surface 22. This truncation gives the inner race 12 a frustospherical shape. Each of the two end surfaces 26 have a circular shape with a constant diameter of the outer edge thereof and include a portion of a central opening 28. The central opening 28 extends through the inner race 12 between the two end surfaces 26.

Referring now to FIGS. 2, 5, 6 and 9, the outer race 14 of the slotted entry bearing assembly 10 defines a cylindrical shape and may be made of a metallic material. The outer race 14 includes two axial faces 30, a central opening 32, and a radially outward facing surface 34. The two axial faces 30 include a front slotted face 36 and a back face 38. Proximate the front slotted face 36, the radially outward facing surface 34 includes a pre-staked flange 40 extending around the circumference. The front slotted face 36 includes a pair of opposing slots 42 forming a loader slot area 44 and a portion of the central opening 32. The central opening 32 of the outer race 14 extends through the outer race 14, from the front slotted face 36 to the back face 38, and defines a central axis 46 of the outer race 14. The central opening 32 of the outer race 14 also includes a radially inward facing curved surface 48 forming a central space 50 configured to receive the radially outward facing surface 22 of the inner race 12 through the loader slot area 44 formed by the pair of opposing slots 42.

It is contemplated that, although the given embodiment has a loader slot area formed by a pair of opposing slots, the loader slot area could be formed by as few as one slot. While a pair of slots may create a symmetrical entry way for the inner race, in some instances one slot alone may provide sufficient clearance for entry of the inner race into the central space of the outer race.

Figure 5:
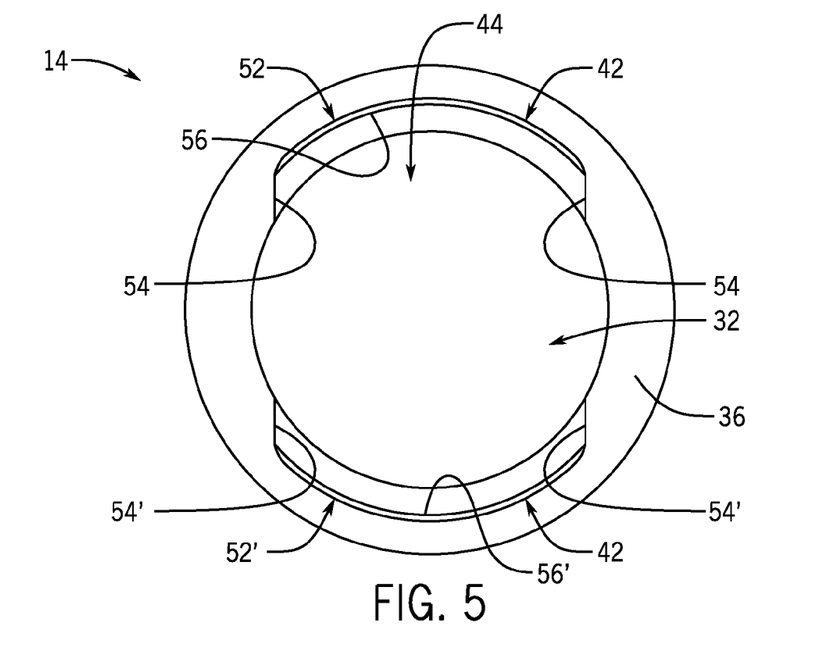
FIG. 5 is an elevational front view of the outer race of the slotted entry bearing assembly of FIG. 1.
Figure 6:
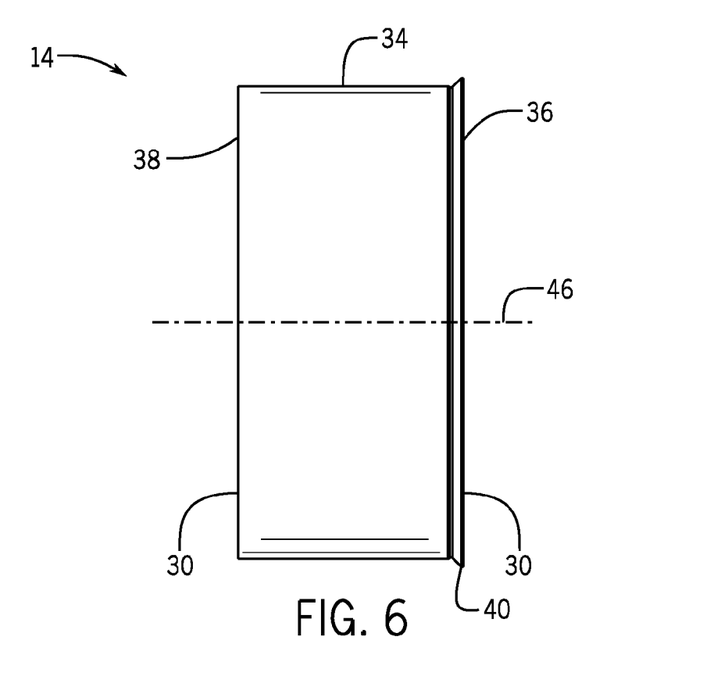
FIG. 6 is an elevational left view of the outer race of the slotted entry bearing assembly of FIG. 1.

The pair of opposing slots 42 are recessed into the front slotted face 36 approximately half the distance through the outer race 14 towards the back face 38. The pair of opposing slots 42 includes a first slot 52 and a second slot 52'. The first and second slots 52, 52' are symmetric, and the following description of the first slot 52 also applies to the second slot 52', with like parts on the second slot 52' labeled in the prime series.

The first slot 52 includes two opposing slot faces 54 with a distance between the two opposing slot faces 54 configured to receive the two end surfaces 26 of the inner race 12 during insertion, as described below. The first slot 52 also includes a radially inward facing surface 56. The radially inward facing surface 56 of the first slot is configured to receive the radially outward facing surface 22 of the inner race 12 during insertion, as described below. The first slot 52 further includes a narrow channel 58 extending in a circumferential direction. The narrow channel 58 is located proximate the front slotted face 36 and is recessed into the radially inward facing surface 56 of the first slot 52. The narrow channel has a first end 60 proximate one of the two opposing slot faces 54, and a second end 62 proximate the other of the two opposing slot faces 54. The narrow channel is located equidistant from the two opposing slot faces 54.

Figure 9:
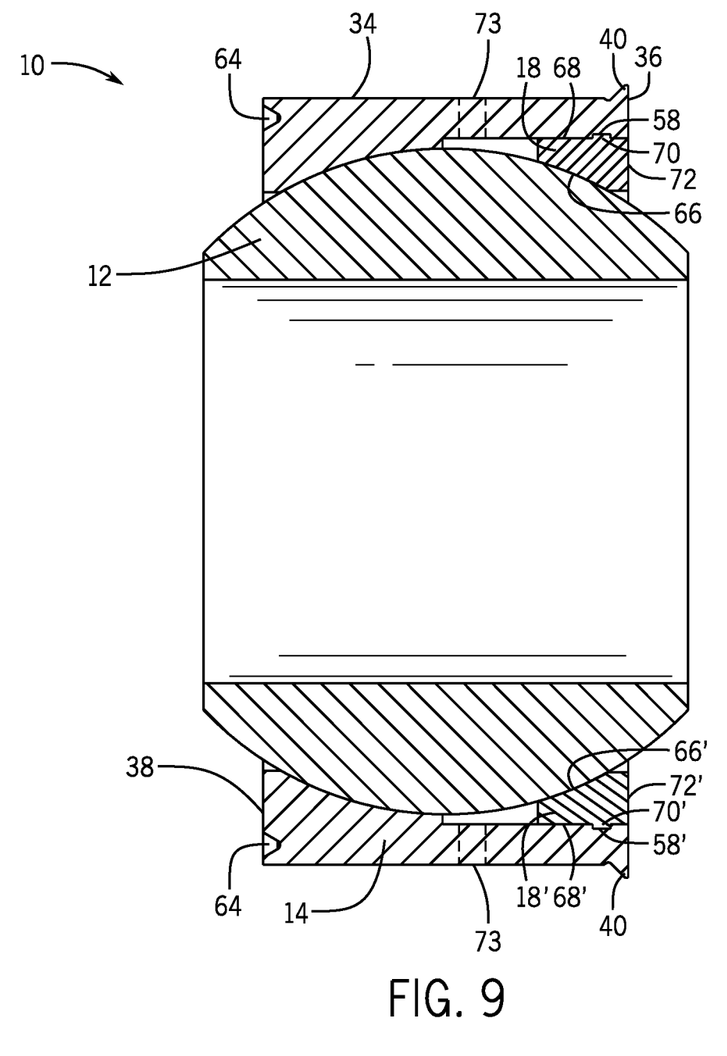
FIG. 9 is cross-sectional front view of the slotted entry bearing assembly along the line 9-9 of FIG. 1.

The back face 38 includes a portion of the central opening 32 of the outer race 14 and a staking groove 64. The staking groove 64 is recessed into the back face 38 and extends around the circumference of the back face 38. In the given embodiment, the staking groove 64 defines a substantially triangular profile in cross-section (as shown in FIG. 9). In other embodiments, the staking groove 64 could define an elliptical, square, rectangular, or any one of a number of other shaped profiles.

In some instances, prior to assembly of the slotted entry bearing assembly 10, the pair of opposing slots 42 on the front slotted face 36 of the outer race 14 are roughened. This roughening is done to promote adhesion between the pair of opposing slots 42 and the molded seal 16 and may be achieved by at least one of grit blasting, etching (which may included acid etching), and ultrasonic cleaning. It should be appreciated that, while in some instances, the pair of opposing slots 42 may be roughened, it is contemplated that this step may not be necessary.

Figure 7:
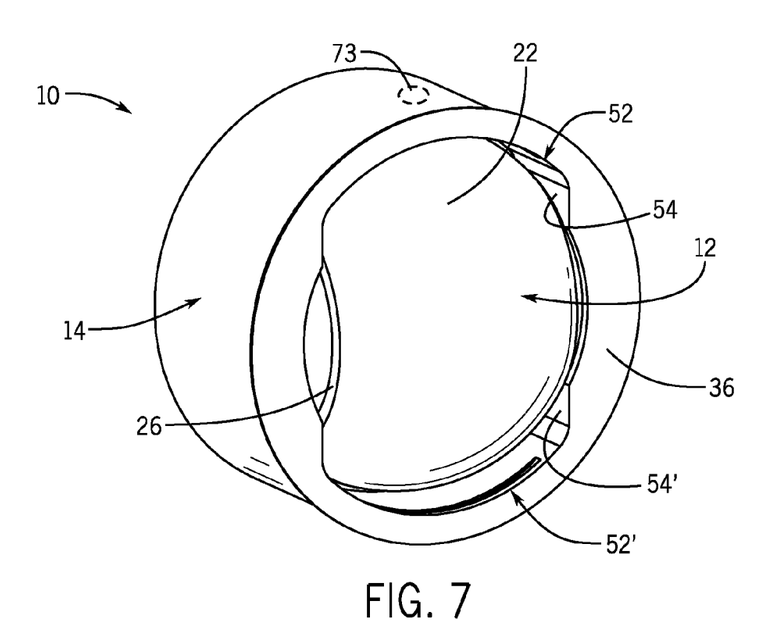
FIG. 7 is a perspective view of the slotted entry bearing assembly of FIG. 1, not including the molded seal, and shown with the inner race turned ninety degrees while being inserted into the outer race.

FIGS. 1, 2, and 7-9 illustrate a method for the assembly of the slotted entry bearing assembly 10. Specifically, FIGS. 2 and 7 show how the inner race 12 is inserted into the outer race 14. The inner race 12 and the outer race 14 are initially provided separately. The inner race 12 is rotated so that the central axis 24 of the inner race 12 and the central axis 46 of the outer race 14 are perpendicular. The inner race 12 is then inserted through the loader slot area 44 on the front slotted face 36 of the outer race 14, with the two end surfaces 26 of the inner race 12 being substantially parallel to the two opposing slot faces 54 of the first slot 52 and the two opposing slot faces 54' of the second slot 52', being fully inserted when the radially outward facing surface 22 of the inner race 12 contacts the radially inward facing curved surface 48 of the central opening 32 of the outer race 14.

Figure 8:
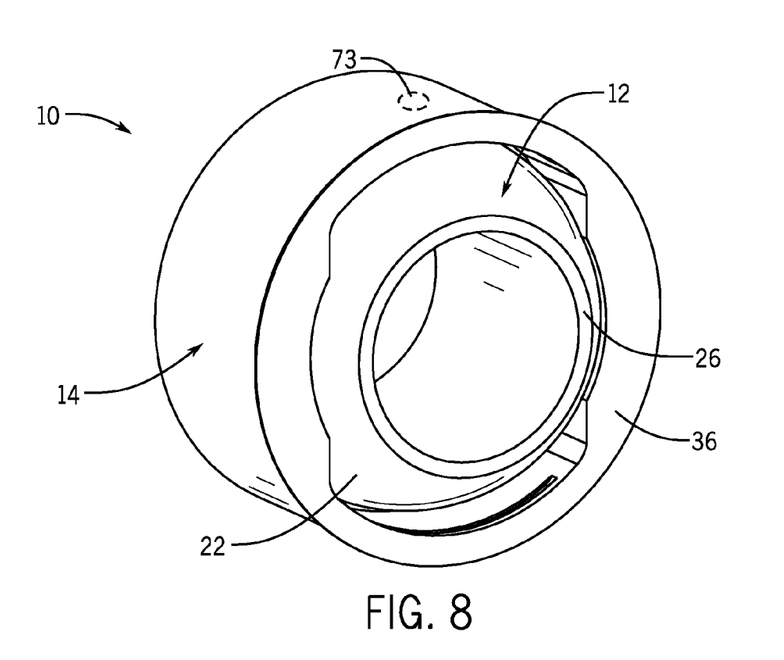
FIG. 8 is a perspective view of the slotted entry bearing assembly of FIG. 1, not including the molded seal.

The inner race 12 is then rotated ninety degrees inside the central space 50 of the outer race 14 as shown in FIG. 8, so that the central axis 24 of the inner race 12 is coaxial with the central axis 46 of the outer race 14. The orientation shown in FIG. 8 effectively locks the inner race 12 within the central space 50 of the outer race 14 due to the geometrical constraints of the inner race 12 and the outer race 14.

With the inner race 12 now in place within the outer race 14 and as shown in FIGS. 1 and 9, the molded seal 16 is molded under pressure into the area between the inner race 12 and the pair of opposing slots 42 on the front slotted face 36 of the outer race 14. The molded seal 16 is made of a polymeric material and adheres to the roughened pair of opposing slots 42. The molded seal 16 may be made of a material that does not adhere to the radially outward facing surface 22 of the inner race 12. In that case, the inner race 12 may not need to be treated with a surface agent to prevent adhesion between the inner race 12 and the molded seal 16 as has traditionally been done.

The molding process used to form the molded seal 16 may be compression molding as in the illustrated embodiment. Compression molding is a method of molding in which a molding material is placed in a mold cavity and pressure is applied to force the material into contact with all of the mold areas. The pressure is then maintained until the molding material has cured. In some instances, heat may also be applied to the material during the compression molding process to improve flowability or increase the rate of curing.

In the particular compression molding process used to produce the slotted entry bearing assembly 10 illustrated, the mold cavity is formed by the area between the inner race 12 and the pair of opposing slots 42 on the front slotted face 36 of the outer race 14. The molding material used is Fluorosilicone.

It is contemplated that while Fluorosilicone is used in the illustrated embodiment, the material may be a different flexible or elastomeric material. The flexible material may be at least one of Silicone, Polytetrafluoroethylene, Nitrile rubber, Fluoroelastomers such as Viton®, Polychloroprene, Polyurethane, Ethylene Propylene Diene Monomer, Perfluoroelastomeric compounds such as Kalrez®, Fluorinated Ethylene Propylene, and Tetrafluoroethylene and Propylene copolymer.

The upper portion 18 and the lower portion 18' of the molded seal 16 are symmetric, and the following description of the upper portion 18 also applies to the lower portion 18', with like parts on the lower portion 18' labeled in the prime series.

The upper portion 18 of the molded seal 16 takes the shape of a void created between the radially outward facing surface 22 of the inner race 12 and the first slot 52. The radially outward facing surface 22 of the inner race 12 gives the upper portion 18 of the molded seal 16 a concave surface 66 when the mold forms during the compression molding process. The first slot 52 of the outer race 14 gives the upper portion 18 of the molded seal 16 a first slot surface 68, including a narrow protrusion 70, resulting from the molding material flowing into the first slot 52 and the narrow channel 58 during the compression molding process. The compression molding is done so the molded seal 16 is formed with an axial face 72 flush with the front slotted face 36 of the outer race 14.

It should be appreciated that while compression molding is the method used in the disclosed embodiment, in other embodiments, the molded seal 16 could also be injection molded or transfer molded.

Injection molding is a method of molding in which a part is produced by injecting heated material into a mold cavity, generally through a gating system. The material then cools and solidifies in the mold cavity. In the case of the slotted entry bearing assembly 10, a radial hole 73 (as shown in FIGS. 1, 2, and 7-9 with dotted lines) could be drilled into the outer race 14 to provide an injection point. The void created between the radially outward facing surface 22 of the inner race 12 and the first slot 52 would have an opening in the axial direction. In the case of injection molding, this opening would be sealed prior to injection of the mold material.

Transfer molding is a method of molding where the mold material is pre-heated and loaded into a holding chamber called a pot. The material is then forced into the pre-heated mold cavity by a hydraulic plunger through a channel called a sprue. This process would be done using a similar method to the injection molding process described above.

After the molded seal 16 is molded into the slotted entry bearing assembly 10, as described above, the slotted entry bearing assembly 10 is ready for operation.

During operation, the inner race 12 rotates relative to the outer race 14 with the radially outward facing surface 22 of the inner race 12 bearing on the radially inward facing curved surface 48 of the outer race 14. The frustospherical shape of the inner race 12 may allow for the inner race 12 and the outer race 14 to rotate in a misaligned position.

It should be appreciated that various other modifications and variations to the preferred embodiments can be made within the spirit and scope of the invention. Therefore, the invention should not be limited to the described embodiments. To ascertain the full scope of the invention, the following claims should be referenced.

What is claimed is:

1. A method of manufacturing a slotted entry bearing assembly, the method comprising:
    inserting an inner race into a central space of an outer race, the outer race being configured to receive the inner race through a loader slot area, formed by at least one slot;
    rotating the inner race approximately ninety degrees within the central space, effectively locking the inner race within the outer race;
    molding a molded seal between the inner race and the at least one slot of the outer race, the molded seal adhering to the at least one slot of the outer race and being made of a polymeric material.

2. The method of claim 1, wherein the molding step further comprises compression molding.

3. The method of claim 1, wherein the molding step further comprises injection molding.

4. The method of claim 1, wherein the molding step further comprises transfer molding.

5. The method of claim 1, wherein the molded seal is made of a flexible material.

6. The method of claim 5, wherein the flexible material is at least one of Fluorosilicone, Silicone, Polytetrafluoroethylene, Nitrile rubber, Fluoroelastomers, Polychloroprene, Polyurethane, Ethylene Propylene Diene Monomer, Perfluoroelastomeric compounds, Fluorinated Ethylene Propylene, and Tetrafluoroethylene and Propylene copolymer.

7. The method of claim 1, wherein the at least one slot is located on a front slotted face of the outer race.

8. The method of claim 1, wherein the inner race defines a central axis of the inner race, the central space of the outer race defines a central axis of the outer race, and the step of inserting the inner race into the central space of the outer race involves the central axis of the inner race being perpendicular to the central axis of the outer race.

9. The method of claim 1, wherein the at least one slot is roughened to promote adhesion between the at least one slot and the molded seal.

10. The method of claim 1, wherein the inner race is not treated with a surface agent to prevent adhesion between the inner race and the molded seal.

11. The method of claim 1, wherein the inner race is made of a metallic material and the outer race is made of a metallic material.

12. The method of claim 1, wherein the at least one slot is a pair of opposing slots.

13. A slotted entry bearing assembly comprising:
    an inner race having a radially outward facing surface;
    an outer race having a central space receiving the inner race, the central space defining a radially inward facing curved surface configured to bear against the radially outward facing surface of the inner race, and the outer race further including at least one slot to allow the insertion of the inner race into the central space of the outer race;
    a molded seal molded between the inner race and the at least one slot of the outer race, adhering to the at least one slot of the outer race, and made of a polymeric material; and
    wherein the inner race and the outer race are rotatable relative to each other during operation with the inner bearing surface of the outer race bearing on the outer bearing surface of the inner race.

14. The slotted entry bearing assembly of claim 13, wherein the molded seal is a compression molded seal.

15. The slotted entry bearing assembly of claim 13, wherein the molded seal is made of a flexible material.

16. The slotted entry bearing assembly of claim 15, wherein the flexible material is at least one of Fluorosilicone, Silicone, Polytetrafluoroethylene, Nitrile rubber, Fluoroelastomers, Polychloroprene, Polyurethane, Ethylene Propylene Diene Monomer, Perfluoroelastomeric compounds, Fluorinated Ethylene Propylene, and Tetrafluoroethylene and Propylene copolymer.

17. The slotted entry bearing assembly of claim 13, wherein the at least one slot is located on a front slotted face of the outer race.

18. The slotted entry bearing assembly of claim 13, wherein the inner race defines a frustospherical shape.

19. The slotted entry bearing assembly of claim 13, wherein the inner race has a central opening.

20. The slotted entry bearing assembly of claim 13, wherein the inner race is not treated with a surface agent on the outer bearing surface to prevent adhesion between the outer bearing surface of the inner race and the molded seal.

21. The slotted entry bearing assembly of claim 13, wherein the inner race is made of a metallic material and the outer race is made of a metallic material.

22. The slotted entry bearing assembly of claim 13, wherein the inner race and the outer race are rotatable relative to each other in a misaligned position during operation.

23. The slotted entry bearing assembly of claim 13, wherein the at least one slot is a pair of opposing slots.

* * * * *